United States Patent
Noui-Mehidi (10) Patent No.: US 10,845,224 B2
(45) Date of Patent: Nov. 24, 2020

(54) ULTRASONIC FLOW MEASUREMENT FOR MULTIPHASE FLUIDS USING SWIRL BLADE SECTION CAUSING VORTICAL FLOW FOR CENTRAL GAS FLOW REGION

(71) Applicant: SAUDI ARABIAN OIL COMPANY, Dhahran (SA)

(72) Inventor: Mohamed Nabil Noui-Mehidi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 46 days.

(21) Appl. No.: 16/207,356

(22) Filed: Dec. 3, 2018

(65) Prior Publication Data

US 2020/0173822 A1    Jun. 4, 2020

(51) Int. Cl.
| | | |
|---|---|---|
| *G01F 1/66* | (2006.01) | |
| *G01F 1/32* | (2006.01) | |
| *G01F 1/74* | (2006.01) | |
| *G01N 29/036* | (2006.01) | |

(52) U.S. Cl.
CPC .............. *G01F 1/66* (2013.01); *G01F 1/3218* (2013.01); *G01F 1/74* (2013.01); *G01N 29/036* (2013.01); *G01N 2291/0224* (2013.01)

(58) Field of Classification Search
None
See application file for complete search history.

(56) References Cited

U.S. PATENT DOCUMENTS

| | | | |
|---|---|---|---|
| 3,370,463 A | 2/1968 | Chanaud | |
| 3,719,073 A | 3/1973 | Mahon | |
| 3,762,221 A | 10/1973 | Coulthard | |
| 3,886,794 A | 6/1975 | McShane | |
| 4,162,630 A | 7/1979 | Johnson | |
| 4,222,710 A * | 9/1980 | Katagiri | ................... F04D 29/38 416/236 A |
| 4,924,710 A | 5/1990 | Inada et al. | |
| 5,121,658 A | 6/1992 | Lew | |
| 5,203,211 A | 4/1993 | Jung | |

(Continued)

FOREIGN PATENT DOCUMENTS

EP    0262436 B1    4/1988

OTHER PUBLICATIONS

International Search Report and Written Opinion for related PCT application PCT/US/2019/064022 dated May 15, 2020.

*Primary Examiner* — Harshad R Patel
(74) *Attorney, Agent, or Firm* — Bracewell LLP; Constance G. Rhebergen; Christopher L. Drymalla (57) ABSTRACT

Ultrasonic measurements are made of a multiphase fluid (oil, water and gas) in pipe or conduits with high values of gas content in the multiphase fluid. Ultrasonic transceivers are positioned around the pipe wall in acoustic contact with the fluid system. The fluid flow is caused to move in a vortex or swirling flow with vortex inducing elements located in the pipe upstream of the transceivers, forcing the gas phase to a cylindrical area at the center of multiphase flow in the pipe, with water and oil multiphase fluid components forming an outer annular flow. Measures of cross sectional composition of the gas portion of multiphase fluid are provided based on the reflected waves from the interface. Tomographic images of the relative presence and position of the three fluid phases are also formed.

25 Claims, 5 Drawing Sheets

(56) References Cited

U.S. PATENT DOCUMENTS

| | | | |
|---|---|---|---|
| 5,719,329 A | 2/1998 | Jepson et al. | |
| 7,895,903 B2 | 3/2011 | Bailey et al. | |
| 8,919,670 B2* | 12/2014 | Shivaram | C21B 7/163 |
| | | | 239/406 |
| 9,243,942 B2 | 1/2016 | Black et al. | |
| 9,404,781 B2 | 8/2016 | Black et al. | |
| 9,424,674 B2 | 8/2016 | Black et al. | |
| 9,714,854 B2 | 7/2017 | Black et al. | |
| 9,721,336 B2 | 8/2017 | Black et al. | |
| 9,829,358 B2 | 11/2017 | Mu et al. | |
| 2007/0124091 A1* | 5/2007 | Wee | G01F 1/74 |
| | | | 702/49 |
| 2007/0201604 A1* | 8/2007 | Chaki | B01D 45/16 |
| | | | 376/301 |
| 2011/0250057 A1* | 10/2011 | Laurello | F01D 5/081 |
| | | | 415/180 |
| 2014/0102213 A1 | 4/2014 | Kuriaki | |
| 2015/0276445 A1* | 10/2015 | Black | G01N 29/036 |
| | | | 73/861.24 |

\* cited by examiner

ULTRASONIC FLOW MEASUREMENT FOR MULTIPHASE FLUIDS USING SWIRL BLADE SECTION CAUSING VORTICAL FLOW FOR CENTRAL GAS FLOW REGION

BACKGROUND OF THE INVENTION

1. Field of the Invention

The present invention relates to ultrasonic measurements of multiphase mixtures of oil, water and gas flowing in pipes or conduits, and particularly where the mixtures have a high presence or quantity of gas content in the flowing mixtures.

2. Description of the Related Art

Tomographic imaging of flow tends to focus in general on the imaging of two phases. The technique generally used for two phase flow reconstruction has been based upon what is known as the filtered back projection algorithm. This type of flow reconstruction is described for example by Kak, Avinash C., Slaney, Malcolm "*Principles of Computerized Tomographic Imaging,*" IEEE Press, New York, USA (1988), and Murrell, H. "*Computer-Aided Tomography,*" The Mathematical J. V6 (1996), pp. 60-65.

However, because of the nature of the fluids present in production of oil and gas it is necessary to form images of three phase flow in conduits involved in hydrocarbon production. Because of the different fluid properties of water (brine), oil and gas it is difficult to address all three sets of fluids simultaneously. In the case of oil-water or water-oil multiphase flows, the medium has been utilized. In the case of liquid-gas or gas-liquid flows (where the liquid is brine or oil or both) an attenuation approach has been utilized. As far as is known, neither method, however, has provided a wholly satisfactory measure or representation of a three phase multiphase flow cross section or of determined volume fractions of each of the three phases. This is particularly the case when there is a significant volume of gas phase in the flowing mixture.

As disclosed in commonly owned U.S. Pat. Nos. 9,424,674 and 9,404,781, flow measures and tomographic images of multiphase mixtures have been obtained when the multiphase mixture is in laminar flow at the location along the pipe where transducer arrays were located to obtain ultrasonic measurements from the multiphase mixture. For this reason, structures in the form of bluff bodies have been mounted in the pipe for the specific purpose of causing laminar flow to be present in the flowing fluid when the fluid passed through the ultrasonic transducers for the purposes of measurement. During laminar flow, the velocity, pressure, and other flow properties at each point in the fluid remain constant. The multiphase fluid during laminar flow moves in parallel layers, with no disruption between the layers. In laminar flow, the multiphase fluid tends to flow without lateral mixing the fluid moves through the pipe or conduit, with the upstream structure causing the fluid to flow substantially along that longitudinal axis. There is thus minimal flow of the multiphase fluid in directions or planes transverse the longitudinal axis of the pipe. Actual flow conditions of the multiphase fluid are, however, typically not those of laminar flow. Under actual flow conditions the formation of accurately indicative measures and indications of the flow conditions and flow rates of the various phases has proven difficult. This is particularly the case when there is fluid containing a significant percentage of gas, or in conditions when the gas flow is not uniformly distributed in the multiphase fixture.

SUMMARY OF THE INVENTION

Briefly, the present invention provides a new and improved apparatus for forming measures of cross sectional composition of a three phase oil, gas and water fluid mixture in multiphase flow in a conduit. The apparatus includes a swirl blade section mounted in the conduit causing vortical flow in the fluid mixture in the conduit. The resultant vortical flow causes the gas to form a central flow region within an outer annular region of the oil and water of the mixture. An array of a plurality of ultrasonic transceivers is mounted about the periphery of the conduit downstream of the swirl blade section. The ultrasonic transceivers transmit ultrasonic energy pulses for travel in the mixture in multiphase flow in in the conduit.

The ultrasonic transceivers mounted about the conduit further receive ultrasonic signals after travel of the transmitted ultrasonic energy pulses in the mixture in multiphase flow in in the conduit. A digital control circuit of the apparatus controls a measurement sequence of the ultrasonic transceivers. An output signal processing circuit receives measures of the ultrasonic energy from the enabled assigned ones of the of the plurality of ultrasonic transceivers and transfers the digital data signals for processing by a data processing system to determine the cross sectional composition of the oil, gas and water mixture in multiphase flow in the conduit. The data processing system forms an output display of the determined cross sectional composition of the three phase oil, gas and water mixture in multiphase flow within the conduit.

The present invention also provides a new and improved method of forming measures of cross sectional composition of a three phase oil, gas and water fluid mixture in multiphase flow in a conduit. A vortical flow is formed in the fluid mixture in the conduit, causing the gas to form a central flow region within an outer annular region of the oil and water of the mixture. Ultrasonic energy signal pulses are transmitted for travel in the mixture in multiphase flow in the conduit, and ultrasonic energy signals are received after travel in the mixture in multiphase flow in the conduit. The received ultrasonic energy signals are processed to determine the cross sectional composition of the oil, gas and water mixture in multiphase flow in the conduit. An output display is then formed of the determined cross-sectional composition of the oil, gas and water mixture in multiphase flow in the conduit.

DETAILED DESCRIPTION OF THE PREFERRED EMBODIMENTS

In the drawings, the letter A designates generally an apparatus according to the present invention for forming measures of cross sectional composition of a three phase oil, gas and water fluid mixture M of oil, gas and water (brine) in multiphase flow in a pipe or conduit C. The measures of cross-sectional flow are determined from ultrasonic tomographic measurements of the flowing multiphase (oil, gas and water/brine) fluids of the mixture M. The multiphase flow is received as inlet flow as indicated at 10 (FIG. 1) in the pipe or conduit C. The conduit C may, for example, be production tubing or surface piping as shown at 24.

Figure 1:
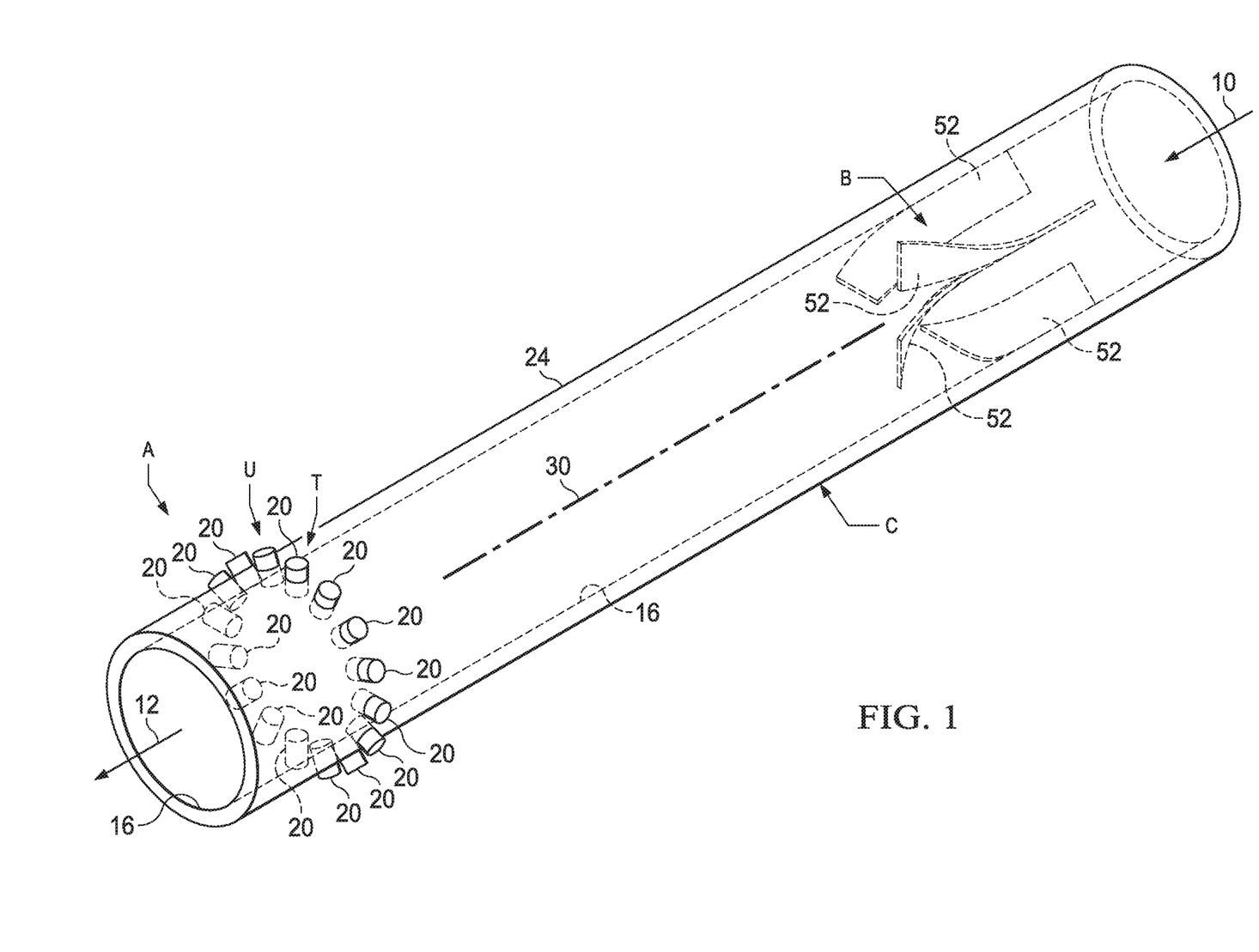
FIG. 1 is an isometric view of an ultrasonic measuring system according to the present invention for multiphase fluids in a fluid pipe or conduit.
Figure 2:
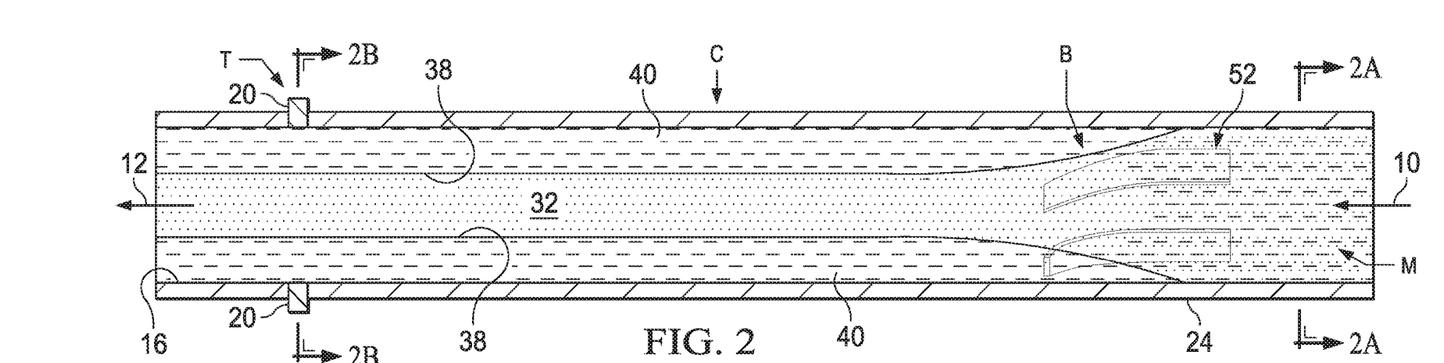
FIG. 2 is a cross-sectional view of the ultrasonic measuring system of FIG. 1 along a longitudinal axis of the pipe.
Figure 3:
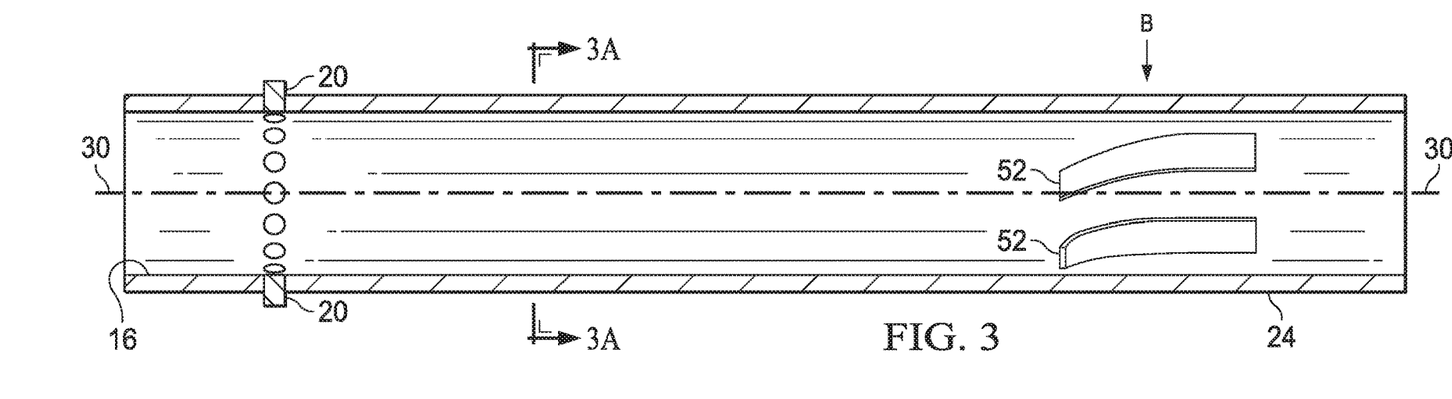
FIG. 3 is a cross-sectional view of the structure of the ultrasonic measuring system and conduit of FIG. 1.

The multiphase fluid in the inlet flow moves in the conduit C from an upstream direction as indicated at 10 through the conduit C past the apparatus A, continuing downstream as indicated at 12 as exit flow. The apparatus A includes a tomographic measurement and imaging system T (FIGS. 1, 2 and 5) mounted with the conduit C, a data processing system D (FIGS. 5 and 6), and a vortex inducing swirl blade section B (FIGS. 1, 2 and 3). The swirl blade section B is mounted on interior wall 16 of the conduit C upstream of the tomographic measurement and imaging system T.

The tomographic measurement and imaging system T includes an ultrasonic transducer array U to sense indications of the multiphase flow 10 is as it moves downstream. Based on the multiphase flow sensed by the ultrasonic transducer array U, the tomographic measurement system T forms measurements from which the data processing system D determines volume fractions of the gas and liquid phases of the multiphase flow. The tomographic measurement system T also forms measures of the multiphase flow from which the data processing system D determines flow rate of individual phases, and also provides a three phase measurement and imaging functionality.

The ultrasonic transceiver array U is formed of circumferentially disposed ultrasonic transceivers 20 (typically fifteen or more) operating at a fixed frequency, or a narrow band of measurement frequency, for example in the range of 150 kHz (kilohertz). The transceivers 20 are mounted with conduit C so that they are closely coupled acoustically to the multiphase flow. It should be understood that it is also possible to replace the transceivers 20 with transmitter-receiver pairs.

The ultrasonic transducers 20 around the pipe wall 24 transmit and receive ultrasonic energy and sense component fluid contents and movement of the multiphase liquid within the pipe C. Flow of the upstream multiphase fluid mixture M (FIG. 2A) passes through swirl blade section B upstream of the tomographic measurement system T (FIGS. 1 and 2). The multiphase liquid is not shown in FIGS. 1 and 3 in order that the swirl blade section B may be more clearly shown.

The swirl blade section B causes the flowing fluids in the multiphase fluid to begin vortical flow along a longitudinal axis 30 of the conduit C. In the induced vortical flow, the fluids exhibit a swirling motion, forcing a gas phase 32 (FIGS. 2 and 2B) to a cylindrical central region along the longitudinal axis 30 of fluid flow through the pipe C as the flow moves through the tomographic measurement transceivers 20. The induced vortical flow is indicated schematically by arrows 34 in FIG. 2B.

The cylindrical vortical flowing gas phase 32 is enclosed within a flowing annular outer mantle or sleeve 40 of the denser liquid (oil and water) of the multiphase flow. This flow formed according to the apparatus of the present invention allows measurement of gas content of the multiphase fluid. Measurement of the gas content is based on two-way travel time of transmitted ultrasonic pulses which are reflected as indicated at 36 from an interface 38 between the cylindrical gas phase 32 and the outer annular mantle or sleeve 40 as the multiphase flow passes the tomographic measurement system T.

According to the present invention, and as shown in FIG. 1, the swirl blade section B includes a suitable number, preferably at least four, of flow directing swirl blades or fin elements 52. The flow directing swirl blades 52 are located on interior wall 16 of the flow conduit C upstream of the tomographic measurement system T. The swirl blades 52 generate a high swirling or vortical flow of the cylindrical gaseous phase 32 along the longitudinal axis 30 of movement of the multiphase fluid mixture as it propagates downstream through the tomographic measurement system T. The swirl blades 52 have several different shapes according to the present invention. For example, the swirl blade bodies 52 may be of the various forms as shown in FIGS. 4A, 4B, 4D and 4E of twisted fins along their longitudinal extent over the interior wall 16 of the conduit C.

The flow directing swirl blades or fins 52 are generally aligned with the longitudinal movement of the multiphase liquid as indicated by the arrows 10 and 12 along the longitudinal axis 30 of the pipe C. A suitable inward extent for the blades is in the range of from about 25% to 40% of the inner diameter of the pipe C. The length of the blades 52 in the direction of fluid flow should be approximately the same as the diameter of the pipe C. The spacing of the blades 52 from the sensors 20 along the conduit C in the direction of fluid flow should preferably be about five times the diameter of the pipe C.

Figure 3A:
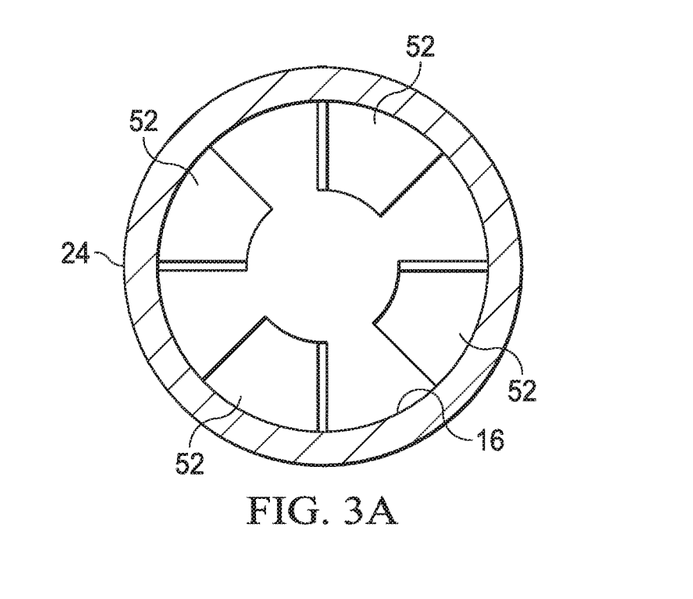
FIG. 3A is a cross-sectional view taken along the line 3A-3A of FIG. 3.

The flow directing blades may be of a number of configurations. The swirl flow inducing blades 52 are shown as several contemplated embodiments (FIGS. 4A through 4F). FIGS. 4A, 4B, 4D and 4E are plan views representing the structure of example flow blade bodies contemplated with the present invention independently of the inner cylindrical wall 16 of the pipe 24. Thus, a first example flow blade body 152 (FIG. 4A) includes an inner body wall joining portion 154 shown as a continuous linear plane along and parallel to the direction of fluid flow 10 in the pipe 24. When actually installed or mounted in the inner cylindrical wall 16 of the pipe 24, the inner body wall joining portion 154 conforms to the curved cylindrical wall 16, as shown in FIGS. 1, 3 and 3A.

Figure 4A:
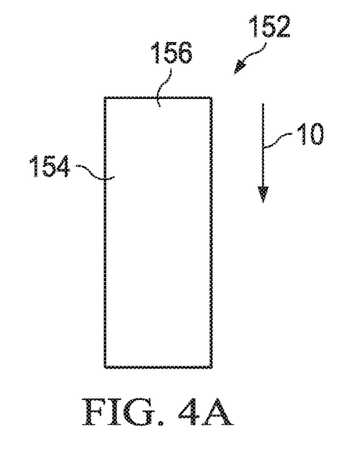
FIG. 4A is a plan view of a swirl flow inducing blade body of the ultrasonic measuring system according to the present invention.

The first example flow blade body 152 shown in FIG. 4A extending inwardly from inner body wall joining portion 154. An upstream section 156 initially extends longitudinally at an upstream section 158 along inner wall 16 of the conduit in a plane aligned with the longitudinal axis of the conduit, transitioning into an arcuate or curved flow blade portion 160, as shown in FIG. 4C. The arcuate or curved blade surface 160 transitions as a curving plate member over its extent along the wall 16 of the conduit to a downstream end portion 162 extending at an angle from between 30° to 45° from the direction of fluid flow. The swirl flow inducing blade body 152 extends radially inwardly from inner body wall joining portion 154 a uniform distance from the inner wall 16 of the conduit as shown in FIG. 4A along its length in the direction of movement of the fluid mixture through the conduit, as indicated by an arrow 10.

Figure 4B:
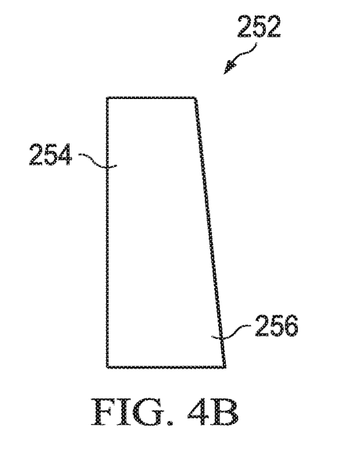
FIG. 4B is a plan view of another swirl flow inducing blade body of the ultrasonic measuring system according to the present invention.
Figure 4C:
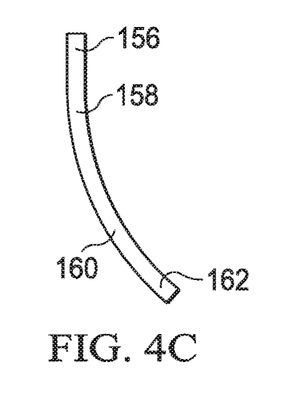
FIG. 4C is a side elevation view of the swirl flow inducing blade bodies of FIGS. 4A and 4B.

FIG. 4B illustrates an alternative flow inducting blade body 252 according to the present invention configured with an arcuate or curved flow blade portion 254 like that of the flow directing blade body 152. The flow inducting blade body 252 extends radially inwardly as indicated at 256, along its length in the direction of fluid movement, an increasing distance from the inner wall 16 of the conduit.

Figure 4D:
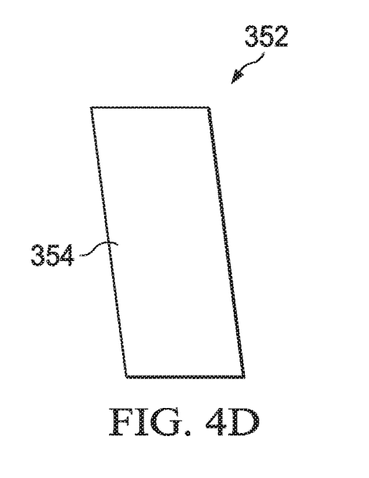
FIG. 4D is a plan view of another swirl flow inducing blade body of the ultrasonic measuring system according to the present invention.

Another example flow blade body contemplated with the present invention as a flow blade 52 is shown as flow inducting blade body 352 in FIG. 4D extending inwardly from inner body wall joining portion 354. As seen in FIG. 4F, the flow blade body 352 is formed as a continuous planar member along the length of its longitudinal extent in the conduit. The flow blade body 352 extends in and inclined plane to the longitudinal axis 30 of the pipe C. The inclined plane is preferably at an angel in a range of from about 30°-45° form the pipe axis 30. The flow blade body 352 is also formed extending inwardly a uniform distance from an inner body wall joining portion 354 the inner wall of the conduit as shown in FIG. 4D along its length in the direction of movement of the fluid mixture through the conduit, as indicated by arrow 10.

Figure 4E:
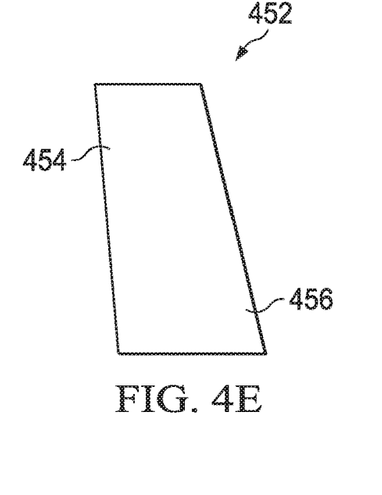
FIG. 4E is a plan view of another swirl flow inducing blade body of the ultrasonic measuring system according to the present invention.
Figure 4F:
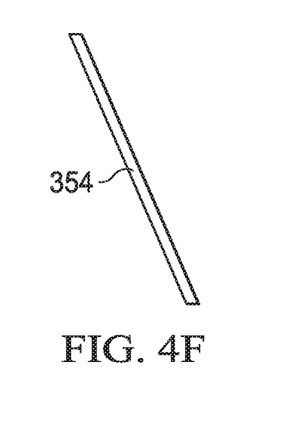
FIG. 4F is a side elevation view of the swirl flow inducing blade bodies of FIGS. 4E and 4E.

FIG. 4E illustrates an alternative flow inducting blade body 452 according to the present invention formed as a continuous planar member 454 along the length of its longitudinal extent in the conduit like that of the flow directing blade body 352. The flow inducting blade body 452 extends radially inwardly as indicated at 456, along its length in the direction of fluid movement, an increasing distance from the inner wall 16 of the conduit.

Thus it should be understood that the flow directing blades according to the present invention may be of a number of configurations, examples of which are shown in FIGS. 4A through 4F. The blades may be of uniform inward extent into the pipe from the pipe wall 16, or may be formed tapering outwardly from an initial upstream end along their length to a downstream end portion With the present invention, physical separation of the flowing gas phase from the liquid phase of the flowing multiphase mixture is provided by the flow directing blade section B. Accordingly, the present invention provides an ability to accurately measure the gas component of the multiphase fluid mixture flowing in the conduit. This is particularly important when conditions of gas flow in the pipe, such as churn flow, cause the gas flow to not exhibit uniform distribution in the flowing multiphase fluid mixture. Thus, the swirl blades or elements 52 of the swirl blade section B in the pipe C upstream of the transducer array U cause the flowing multiphase fluid to be physically separated into distinct gas and liquid phases as the flowing liquid passes through the region of the transducer array U. Further, the present invention provides the ability for measurement of the gas content of the multiphase flowing fluid.

Figure 2A:
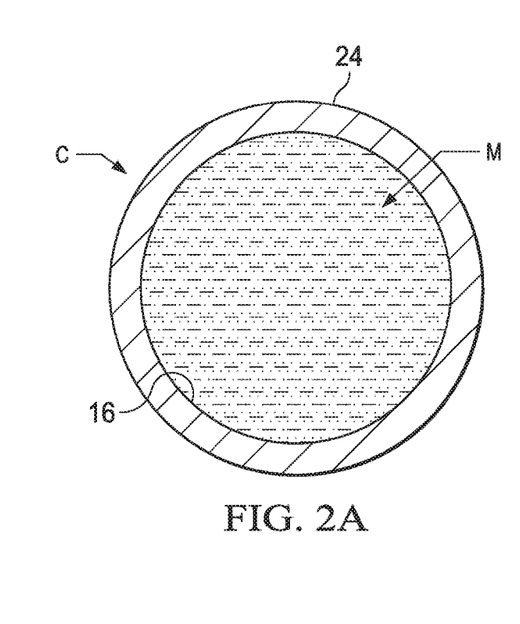
FIG. 2A is a cross-sectional view taken along the line 2A-2A of FIG. 2.

With the present invention, fluid flow is caused as shown in FIGS. 2 and 2A to swirl cylindrically along the longitudinal axis 30 of the pipe by the swirl blades 52. The upstream swirl blades arrangement of the swirl blade section B forces the gas phase of the multiphase fluid in the conduit C to transition to a gas swirl, the flow region of the gas core 32, and further inwardly toward the center of the pipe flow.

When the flowing multiphase fluid mixture travels through the swirl blades 52, the structure and arrangement of the swirl blades causes a swirling effect to be induced in the multiphase fluid so that it swirls in a vortical movement in a vertical plane transverse that of the axis 30 of longitudinal flow of the multiphase fluid through the conduit C. The swirling flow introduced into the multiphase fluid by the swirl blades 52 causes the fluid to swirl with a high vortex-like motion causing a phase separation between the gas and the liquid oil/water mixture 40 of the multiphase fluid. The less dense gaseous phases are forced inwardly towards the center of the pipe C along its longitudinal axis 30. The denser liquid oil/gas mixture forms a flowing annular ring in a plane transverse the longitudinal axis 30 of fluid flow through the pipe about the inner core of the flowing gas.

As the traveling fluid passes through the transducer measurement array U downstream of the swirl blade section B, the cylindrical swirling gas region 32 is present in the center of the pipe C, while the liquid phases 40 of oil and water are circumferentially disposed outwardly between the gas region 32 and the conduit wall 24. This allows the measurement of the gas content based on the reflected waves 36 from interface 38 between the inner gas flowing core and the outer liquid phases 40.

Figure 5:
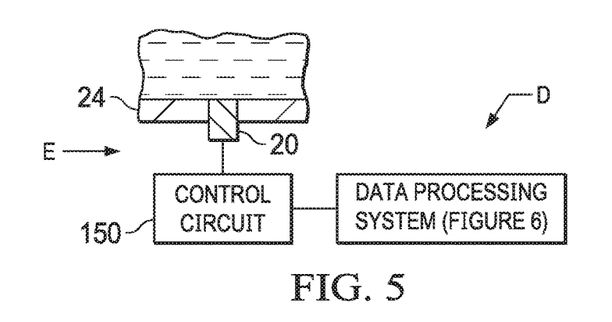
FIG. 5 is a schematic electrical circuit diagram of processing electronics of the multichannel ultrasonic imaging system according to the present invention.

The emitted ultrasonic waves from each of the emitting ones of the ultrasonic transducers 20 have part of their transmitted ultrasonic energy reflected at the interface 38 between the inner gas core 32 and the outer annular ring 40 of the flowing liquid mixture. The ultrasonic energy reflected at the interface 38 is sensed by the adjacent receiving ultrasonic transducers 20 of the transducer array and the time of travel of the ultrasonic energy from transmission, reflection as indicated at 36 (FIG. 2B) by the interface 38, and receipt by the receiving ultrasonic transducers 20 is sensed by the processing electronics circuitry E (FIG. 5). The transducer array U forms ultrasonic measurements of sensed fluid conditions. The ultrasonic measurements are provided as flow measurement data to the data processing system D for determination of volume fractions of the gas and liquid phases of the multiphase flow. The data processing system D determines flow rate of individual phases; and provides a three phase measurement and imaging functionality. The activation and energization of the individual ones of the transducers 20 is described in applicant's U.S. Pat. No. 9,989,397, and which is incorporated herein by reference for all purposes.

The tomographic measurement system T of the apparatus A also includes processing electronics E (FIG. 5) and a data processing system D (FIG. 6) to determine cross sectional composition and imaging of the flowing multiphase mixture and provide output data indicating the determined results. The processing electronics E operates according to commonly owned U.S. Pat. No. 9,989,387. The data processing system D in the preferred embodiment operates according to commonly owned U.S. Pat. No. 9,424,674 to determine and provide three-phase descriptions of the multiphase mixture based on measurements from the tomographic measurement system T.

Figure 2B:
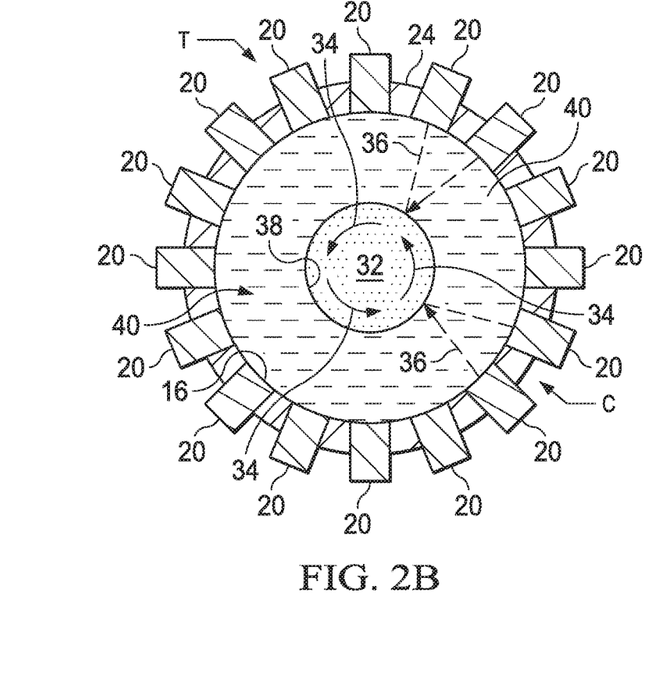
FIG. 2B is a cross-sectional view taken along the line 2B-2B of FIG. 2.

As described in commonly owned U.S. Pat. No. 9,424,674, the travel of ultrasonic energy through the fluids in the conduit C occurs over a network of transmission channels so that fluid properties are measured based on travel times of ultrasonic pulses sequentially emitted by individually activated ones of the ultrasonic transceivers and adjacent receiving transceivers 20 as indicated in FIG. 2B.

The tomographic measurement system T preferably operates according to Applicant's U.S. Pat. Nos. 9,424,674; 9,404,781; 9,721,336; and 9,989,387 to provide the tomographic images formed by the data processing system D. Each of these commonly owned U.S. Patents is incorporated herein by reference for all purposes. As shown schematically in FIG. 4B, the central or vortically flowing or swirling core 32 of flowing gas inside the outer annular mantle 40 of oil and water liquids of the multiphase fluid provides an example image of the cross sectional composition so determined.

The cross sectional area of the core 32 of formed by the swirl blade section B in relation to the interior cross sectional area of the conduit C is indicative of the relative composition of gas in the multiphase mixture in the conduit C. The tomographic measurement system T and tomographic imagery reconstruction methodologies for flow tomography of multiphase flow in the conduit C are described in those previously mentioned, commonly owned patents. It should be understood that other forms of imagery reconstruction may also be used. A description of other forms of imagery reconstruction algorithms is provided by Avinash C. Kak and Malcolm Slaney, *"Principles of Computerized Tomographic Imaging,"* IEEE Press, New York, USA (1988) and H. Murell, *"Computer-Aided Tomography,"* The Mathematical J. V6 (1996), pp. 60-65.

In the processing electronics circuitry E, the sensed measures of ultrasonic energy travel time obtained from the ultrasonic transceivers 20 are converted into format suitable for processing by the data processing system D according to the present invention. Travel times measured for reflected waves from an interface 38 between the flowing gas core 32 and the outer annular mantle 40 of oil and water liquids at the receiving transducers indicate the radial distance between the inner surface 16 of the conduit C and the interface 38. Determination of the cross-sectional area of the gas core 32 is thus based on the collected time of travel of the ultrasonic waves. The cross-sectional area of the liquid annulus 40 is the remaining cross sectional area of the interior of conduit C. In addition, the data processing system D quantifies the amount of oil, and water, flowing in the annular region between the gas core and the pipe wall.

When high gas volumes are present and due to the high swirl flow imposed by the swirl blades, the less dense gas phase forms a hollow core in the center of the pipe, while the more dense phases, namely water and oil with occupy the rest of the pipe section. When ultrasonic waves are sent from the tomographic transducers, there are reflections coming from the interface of the liquid and gas. These reflections are captured and processed in order to assess how large in cross sectional area is the gas core in the center of the pipe. Knowing the pipe diameter, the percentage of gas present from these reflections is determined based on the relative cross sectional areas of the gas core and the pipe. The received ultrasonic signals also contain information regarding the amount of oil-water mixture in the pipe since the reflected waves are also attenuated due to presence of water droplets in the oil phase or vice versa, as for a conventional tomographic measurement that is explained in commonly owned U.S. Pat. Nos. 9,424,674; 9,404,781; 9,721,336; and 9,889,387, as has been described.

The phase fraction measurement for oil, water and gas phases is computed in a similar manner using methods provided in previously referenced commonly-owned U.S. Pat. No. 9,404,781 "Multiphase Metering with Ultrasonic Tomography and Vortex Shedding" and U.S. Pat. No. 9,424,674 "Tomographic Imaging of Multiphase Flows."

As flow moves through the conduit C, the tomographic array U which as described previously, gathers flow data to determine in the manner of Applicants' U.S. Pat. No. 9,989,397, the relative amounts or fractions of oil, water and gas contained within the cross sectional area of the conduit C within the array U. The relative fractions so determined, and mean fluid velocity are then used in the data processing system D to produce in-situ estimates for the oil, water and gas flows without the need for calibration.

The tomographic array U determines a relative cross sectional fraction of oil, water (or brine) and gas expressed as a percentage of total cross sectional area. Since the total cross sectional area of the tomographic measurement section is known from dimensions of the pipe these percentages provide an estimate of the exact cross sectional area of each phase fraction expressed in units of area. For example, if the total cross sectional area is 0.5 $m^2$ (square meters), and the oil cross sectional fraction is 30% then the total cross sectional area of oil is equal to 0.15 $m^2$. A similar approach is applied to the other phase fractions based on the relative phase fractions.

FIG. 5 illustrates the processing electronic circuit E according to the present invention. The processing electronic circuit E includes a signal control circuit 150 which provides control of signal formation by the transducers and processing of the ultrasonic energy received by the receiving transducers. Processing electronic circuit E operates for example, according to the electronic processing operations described in commonly owned U.S. Pat. No. 9,989,387. The signal control circuit 150 provides pre-amplification and a switching capability which minimizes cross talk between tomography channels. The signal control circuit 150 converts multiple parallel analog channels of data sensed by the array U into a suitable data format to minimize both the number of external feedthroughs and also the bandwidth required for transmission.

The signal control circuit 150 sends a pulse which is to be emitted as ultrasonic energy to the appropriate transceiver 20. The signal control circuit 150 amplifies the measured signals after travel through the multiphase fluid from the emitting transceiver 20 and converts the amplified measured signals into digital signals by analog to digital conversion, and stores the digital version of the measured signals in local memory. When a tomography measurement cycle by the array U is complete, the signal control circuit 150 retrieves the stored digital signals and transmits the signal digital data in serial form to the data processing system D.

The data processing system D processes the tomographic data in the manner described in Applicant's U.S. Pat. No. 9,989,397 previously cited, and generates a tomographic image cross section of the multiphase flow in the conduit C.

Figure 6:
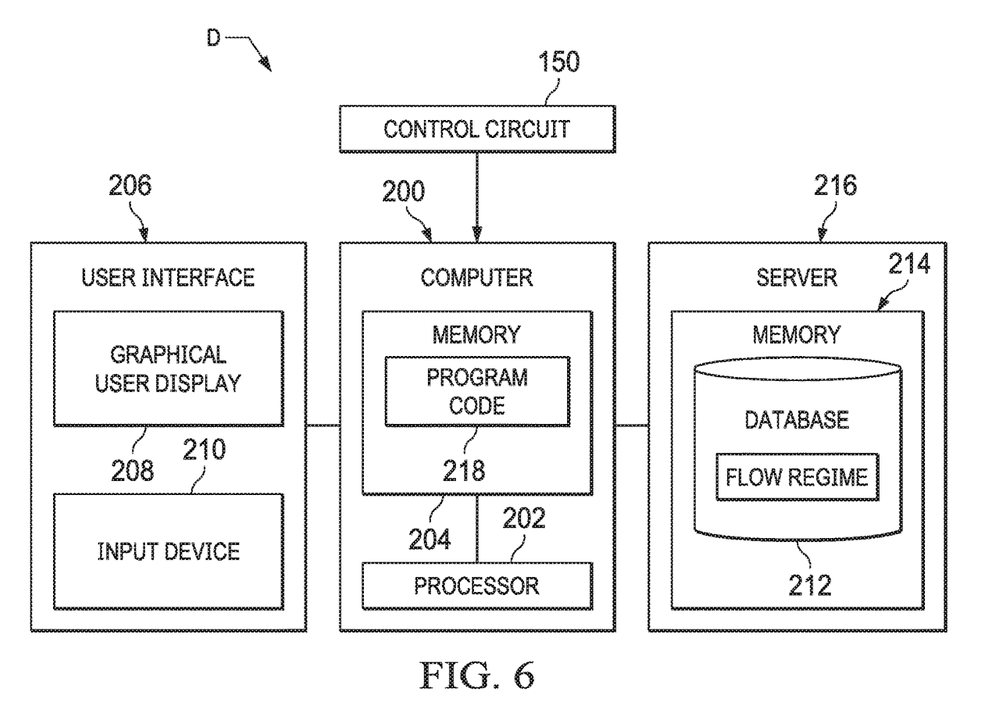
FIG. 6 is a schematic diagram of a data processing system of the processing electronics of FIG. 5.

As illustrated in FIG. 6, the data processing system D according to the present invention includes a computer 200 having a processor 202 and memory 204 coupled to the processor 202 to store operating instructions, control information and database records therein. The computer 200 may, if desired, be a Linux cluster such as is available from HP Corporation or other source, a multicore processor with nodes such as those from IBM, Intel Corporation or Advanced Micro Devices (AMD), or a mainframe computer of any conventional type of suitable processing capacity such as those available from IBM, or other source.

It should be noted that other digital processors, may be used, such as personal computers in the form of a laptop computer, notebook computer or other suitable programmed or programmable digital data processing apparatus.

The computer 200 has a user interface 206 and an output display 208 for displaying output data or records according to the present invention to measure multiphase flow based on and form tomographic images of multiphase flow in conduits based on tomographic data from the transducer array U. The output display 208 includes components such as a printer and an output display screen capable of providing printed output information or visible displays in the form of graphs, data sheets, graphical images, data plots and the like as output records or images.

The user interface 206 of computer 200 also includes a suitable user input device or input/output control unit 210 to provide a user access to control or access information and database records and operate the computer 200. The input/output control unit 210 also may receive data measurements of flow obtained during data acquisition in the manner described previously. Data processing system D further includes a database 212 stored in memory, which may be internal memory 204, or an external, networked, or non-networked memory as indicated at 214 in an associated database server 216.

The data processing system D includes program code 218 stored in non-transitory memory 204 of the computer 200. The program code 218, according to the present invention is in the form of computer operable instructions causing the data processor 202 to form tomographic images of multiphase flow in conduits, as has been set forth.

It should be noted that program code 218 may be in the form of microcode, programs, routines, or symbolic computer operable languages that provide a specific set of ordered operations that control the functioning of the data processing system D and direct its operation. The instructions of program code 218 may be stored in non-transitory form in memory 204 of the computer 200, or on computer diskette, magnetic tape, conventional hard disk drive, electronic read-only memory, optical storage device, or other appropriate data storage device having a non-transitory computer usable medium stored thereon. Program code 218 may also be contained on a data storage device such as server 214 as a non-transitory computer readable medium, as shown.

The invention has been sufficiently described so that a person with average knowledge in the matter may reproduce and obtain the results mentioned in the invention herein. Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

The invention claimed is:

1. An apparatus for forming measures of cross sectional composition of a three phase oil, gas and water fluid mixture in multiphase flow in a conduit, comprising:
   (a) a swirl blade section mounted in the conduit causing vortical flow in the fluid mixture in the conduit causing the gas to form a central flow region within an outer annular region of the oil and water of the mixture along a longitudinal of the conduit, the swirl blade section comprising four or more swirl directing flow blades, each swirl directing flow blade comprising a curved fin fixedly attached to and extending from an inner wall of the conduit;
   (b) an array of a plurality of ultrasonic transceivers mounted about the periphery of the conduit downstream of the swirl blade section, the ultrasonic transceivers transmitting ultrasonic energy pulses for travel in the mixture in multiphase flow in the conduit;
   (c) the array of a plurality of ultrasonic transceivers mounted about the periphery of the conduit further receiving ultrasonic signals after travel of the transmitted ultrasonic energy pulses in the mixture in multiphase flow in the conduit;
   (d) a digital control circuit controlling a measurement sequence to enable ones of the ultrasonic transceivers;
   (e) an output signal processing circuit receiving measures of the ultrasonic energy from the enabled ones of the plurality of ultrasonic transceivers and transferring data signals for processing to determine the cross sectional composition of the oil, gas and water mixture in multiphase flow in the conduit; and
   (f) a data processing system forming an output display of the determined cross sectional composition of the three phase oil, gas and water mixture in multiphase flow within the conduit.

2. The apparatus of claim 1, wherein each swirl directing flow blade comprises
   a swirl flow inducing blade body extending inwardly into the fluid mixture in multiphase flow in the conduit.

3. The apparatus of claim 2, wherein the swirl flow inducing blade body extends radially inwardly a uniform distance from the inner wall of the conduit.

4. The apparatus of claim 2, wherein the swirl flow inducing blade body extends radially inwardly an increasing distance from the inner wall of the conduit in the direction of movement of the fluid mixture through the conduit.

5. The apparatus of claim 2, wherein the swirl flow inducing blade body extends longitudinally along the inner wall of the conduit in the direction of movement of the fluid mixture through the conduit.

6. The apparatus of claim 2, wherein the swirl flow inducing blade body extends longitudinally along the inner wall of the conduit in a plane aligned with the longitudinal axis of the conduit.

7. The apparatus of claim 2, wherein the swirl flow inducing blade body extends longitudinally along the inner wall of the conduit in a plane transverse the longitudinal axis of the conduit.

8. The apparatus of claim 2, wherein the swirl flow inducing blade body comprises an upstream section extending longitudinally in an upstream section along the inner wall of the conduit in a plane aligned with the longitudinal axis of the conduit, and a downstream section extending in a plane longitudinally along the inner wall of the conduit in a plane transverse the longitudinal axis of the conduit.

9. The apparatus of claim 2, wherein the swirl flow inducing blade body comprises an upstream section extending longitudinally in an upstream section along the inner wall of the conduit in a plane aligned with the longitudinal axis of the conduit, and a downstream section extending as an arcuate surface along the inner wall of the conduit.

10. The apparatus of claim 1, wherein ultrasonic transceivers in the array receive reflected ultrasonic energy signals from an interface of the central gas flow region with the outer annular region of the oil and water of the mixture.

11. The apparatus of claim 10, wherein the measures of ultrasonic energy received by the output signal processing circuit comprise measures of the travel time of the reflected ultrasonic energy signals.

12. The apparatus of claim 11, wherein the data processing system determines the cross sectional composition of the three phase oil, gas and water mixture based on the measures of the travel time of the reflected ultrasonic energy signals.

13. The apparatus of claim 1, further including:
 (a) the data processing system forming measures of the speed of travel of the ultrasonic energy between individual ones of the plurality of ultrasonic transceivers; and
 (b) the data processing system forming measures of the attenuation of the ultrasonic energy between individual ones of the plurality of ultrasonic transceivers.

14. The apparatus of claim 1, further including: the data processing system forming a synthesized composite image of the relative presence and position of the three fluid phases over a cross-sectional area of the conduit based on measures of speed of travel and attenuation of energy in the conduit.

15. The apparatus of claim 14, wherein the data processing system forms an image of the synthesized composite image of the relative presence and position of the three fluid phases.

16. The apparatus of claim 1, further including:
 (a) an input signal forming circuit sending a pulse to be emitted as ultrasonic energy during the measurement sequence to a selected one of the plurality of ultrasonic transceivers for travel through the mixture in multiphase flow in the conduit;
 (b) the input signal forming circuit including a multiplexer responding to the control signal from the digital control circuit to isolate the selected one of the plurality of ultrasonic transceivers during emission of the pulse of ultrasonic energy; and
 (c) the input signal forming circuit multiplexer further responding to the control signal to enable assigned ones of the plurality of ultrasonic transceivers to receive measures of the emitted pulse of ultrasonic energy after travel through the mixture in multiphase flow between the transceivers.

17. The apparatus of claim 1, further including: a pulse driver forming pulse drive signals to cause travel of ultrasonic energy signal pulses of the measurement sequence through the mixture in multiphase flow in the conduit.

18. The apparatus of claim 1, further including: (a) a plurality of analog switches to receive measures of the ultrasonic energy from the enabled ones of the plurality of ultrasonic transceivers; and (b) the output signal processing circuit further including an analog to digital converter converting the received measures of the ultrasonic energy signals from the plurality of analog switches into digital data signals.

19. A method of forming measures of cross sectional composition of a three phase oil, gas and water fluid mixture in multiphase flow in a conduit, comprising the steps of:
 (a) forming a vortical flow in the fluid mixture in the conduit, causing the gas to form a central flow region within an outer annular region of the oil and water of the mixture, the forming of the vortical flow in the fluid mixture in the conduit comprising passing the fluid mixture over a swirl blade section mounted in the conduit, the swirl blade section comprising four or more swirl directing flow blades, each swirl directing flow blade comprising a curved fin fixedly attached to and extending from an inner wall of the conduit;
 (b) transmitting ultrasonic energy signal pulses for travel in the mixture in multiphase flow in the conduit;
 (c) receiving ultrasonic energy signals after travel in the mixture in multiphase flow in in the conduit;
 (d) processing the received ultrasonic energy signals to determine the cross sectional composition of the oil, gas and water mixture in multiphase flow in the conduit; and
 (e) forming an output display of the determined cross-sectional composition of the oil, gas and water mixture in multiphase flow in the conduit.

20. The method of claim 19, wherein the step of receiving comprises the step of receiving the ultrasonic energy signals from an interface of the central gas flow region with the outer annular region of the oil and water of the mixture.

21. The method of claim 20, wherein the step of receiving further comprises forming measures of travel time of reflected ultrasonic energy signals.

22. The method of claim 20, wherein the step of processing further comprises processing the received ultrasonic energy signals to determine the cross sectional composition of the oil, gas and water mixture in multiphase flow in the conduit based on the measures of the travel time of the reflected ultrasonic energy signals.

23. The method of claim 19, further including the steps of: (a) forming measures of speed of travel of the transmitted ultrasonic energy; and (b) forming measures of attenuation of the transmitted ultrasonic energy.

24. The method of claim 19, further including the step of: forming a synthesized composite image of relative presence and position of the oil, gas and water mixture over a cross-sectional area of the conduit.

25. The method of claim 24, further including the step of:
 displaying the synthesized composite image of the relative presence and position of the three fluid phases over a cross-sectional area of the conduit for evaluation and analysis.

* * * * *